Dec. 19, 1967     D. S. CHISHOLM     3,358,323
PROCESSING OF PLASTIC

Original Filed March 25, 1963     3 Sheets-Sheet 1

INVENTOR.
Douglas S. Chisholm
BY
AGENT

INVENTOR.
Douglas S. Chisholm
BY
AGENT

Dec. 19, 1967  D. S. CHISHOLM  3,358,323
PROCESSING OF PLASTIC

Original Filed March 25, 1963  3 Sheets-Sheet 3

INVENTOR.
Douglas S. Chisholm
BY
AGENT

United States Patent Office 3,358,323
Patented Dec. 19, 1967

3,358,323
PROCESSING OF PLASTIC
Douglas S. Chisholm, Midland, Mich., assignor to The Dow Chemical Company, Midland, Mich., a corporation of Delaware
Original application Mar. 25, 1963, Ser. No. 268,215. Divided and this application Jan. 13, 1966, Ser. No. 535,633
15 Claims. (Cl. 18—2.6)

ABSTRACT OF THE DISCLOSURE

Thermoplastics such as polyethylene are formed into pellets by centrifugally extruding strands and severing the strands adjacent the centrifugal extrusion die. Very small particles are readily obtained.

---

This application is a divisional application of application Ser. No. 268,215, filed Mar. 25, 1963, now abandoned.

This application is also a continuation-in-part of my previously filed application Ser. No. 214,942, filed Aug. 6, 1962, now abandoned.

This invention relates to processing apparatus. It more particularly relates to a centrifugal extrusion apparatus for the preparation of granular material.

In the preparation of thermoplastic resinous molding compositions usually the polymeric material in molten form is extruded through a die as a strand or a plurality of strands which is subsequently cooled and cut into granules by means of a grinder or similar mechanism. The granules represent a widely useable form of the polymeric material having a relatively low surface per unit of volume and may be readily utilized in injection molding equipment, extrusion equipment, and the like. Frequently, polymeric materials are polymerized in suspension or emulsion and the resultant product has relatively high surface and a low bulk density. Equipment suited for transforming either mass, emulsion or suspension polymer into suitable molding granules is usually expensive, complicated, and requires relatively high maintenance. The polymeric material must be heated to a molten condition and be forced under pressure through one or more suitable orifices, the extrude is then cooled and subsequently comminuted to a suitable size.

It is an object of this invention to provide an improved apparatus for the preparation of a particulate thermoplastic resinous material.

It is another object of this invention to provide a simplified apparatus for the preparation of molding granules.

It is a further object of this invention to provide a centrifugal apparatus for the preparation of granules. A further object is to provide a means to develop pressure sufficient to extrude thermoplastics without employing conventional extrusion equipment.

These benefits and other advantages in accordance with the invention are achieved by providing an apparatus comprising means to supply a heat plastified thermoplastic resinous material in cooperative combination with a rotor, said rotor comprising a circular body defining an internal cavity, a plurality of circumferential passageways, said passageways providing a means of communication between said cavity and the periphery of said rotor, means to rotate said rotor, means to sever a thermoplastic resinous material positioned generally adjacent to the periphery of said rotor, said means of supply of molten polymeric material adapted to add molten material to said cavity of said rotor.

Further features and advantages of the invention will become more apparent from the following specification when taken in conjunction with the drawing wherein.

Figure 1:
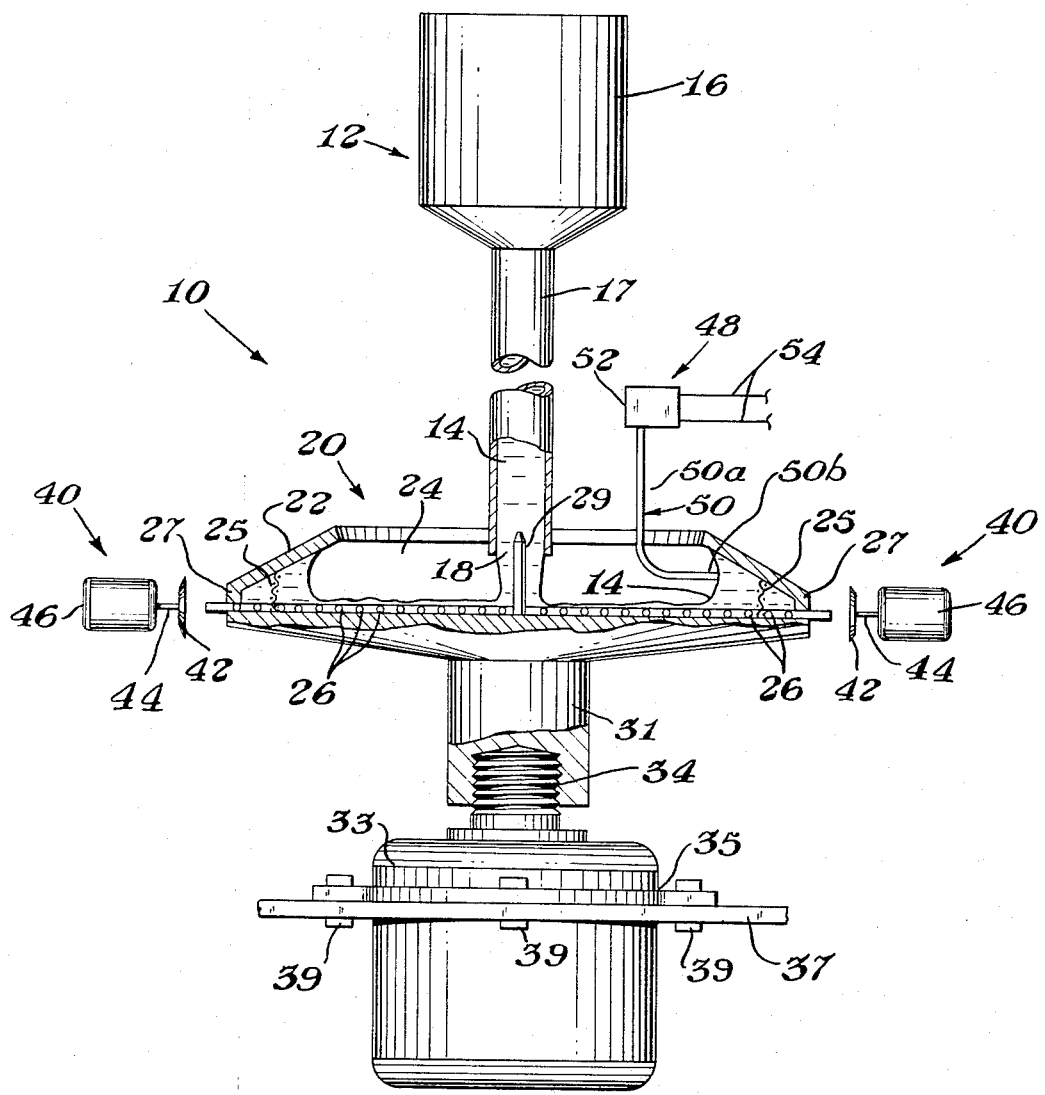
FIG. 1 is a partly in section view of an apparatus in accordance with the invention.

In FIGURE 1 there is illustrated a partly in section view of an apparatus 10 in accordance with the invention. The apparatus 10 comprises a source 12 of molten thermoplastic material 14. The source 12 comprises a melting chamber 16 and a delivery conduit 17. The delivery conduit 17 is terminated by an opening 18. Adjacent the opening 18 is disposed a rotor generally designated by the reference numeral 20. The rotor 20 comprises a body 22 defining an internal cavity 24 and a plurality of peripherally disposed passageways 26 providing communication between the periphery 27 of the rotor 20 and the internal cavity 24. Disposed within the cavity 24 is a generally annular filter or screen pack 25. Centrally disposed within the cavity 24 is an axially disposed pin 29 projecting into the cavity 24 and the opening 18 of the conduit 17. The rotor 20 has a hub 31. The hub 31 is in operative engagement with a rotary drive means 33 by means of the stud 35. The drive means 33 is provided with a flange 35 which is secured to a support frame 37 by means of the bolts 39. A plurality of cutting assemblies generally designated by the reference numeral 40 are disposed adjacent to the periphery 27 of the rotor 20. The cutting assemblies 40 comprise a rotary knife 42 supported and rotated by a shaft 44. The shaft 44 in turn is rotated by the drive means 46. The cutting assemblies 40 are maintained in position by support means not shown. A control 48 is positioned adjacent the open face of the cavity 24. The control 48 comprises a sensing probe 50 having a shaft 50A and a toe portion 50B. The toe portion 50B is resiliently loaded to press against the surface of the polymer 14 within the cavity 24. The sensing element 50 is operatively connected to a signaling device 52 provided with a signal transmission means 54.

Figure 2:
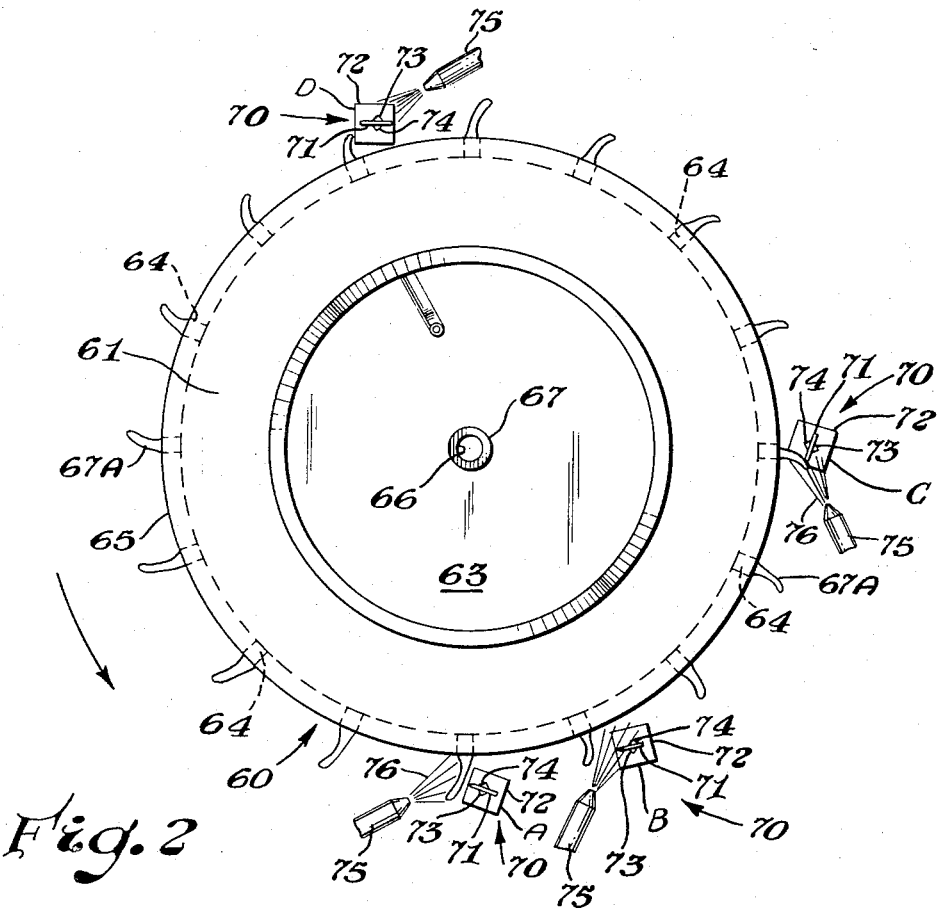
FIGURE 2 is a plan view of a rotor with cutting devices.
Figure 2A:
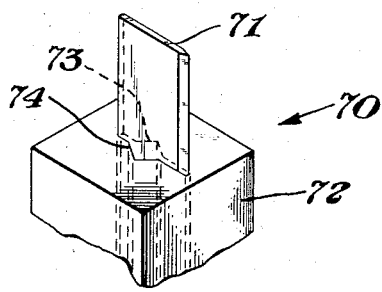
FIGURE 2A is a detail view of a cutting means.

In FIGURE 2, there is illustrated a schematic top view of a rotor 60 in accordance with the invention wherein the polymer feed source and body of the control element are omitted. The rotor 60 comprises a body 61, defining a cavity 63 and a plurality of peripheral passageways 64 providing passageway between the internal cavity 63 and the outer surface 65 of the rotor 60. Disposed within the cavity 63 is a centrally positioned pin or mandrel 66 and a quantity of molten thermoplastic material 67. The direction of rotation of the rotor 60 is indicated by the arrow. Emerging from the passageways 64 are a plurality of strands of thermoplastic resinous material 67A which extend generally radially from the rotor 60. Disposed about the periphery of the rotor 60 are a plurality of cutters or knives 70. Each of the cutters 70 comprises a blade 71 carried on a support 72. Cooling fluid channels 73 and 74 are positioned adjacent the base of knife 70 in the base 72. Disposed adjacent to each of the cutters 70 is a cooling supply means 75 which provides cooling fluid 76 directed toward the strands 67A and the knives 71.

Figure 3:
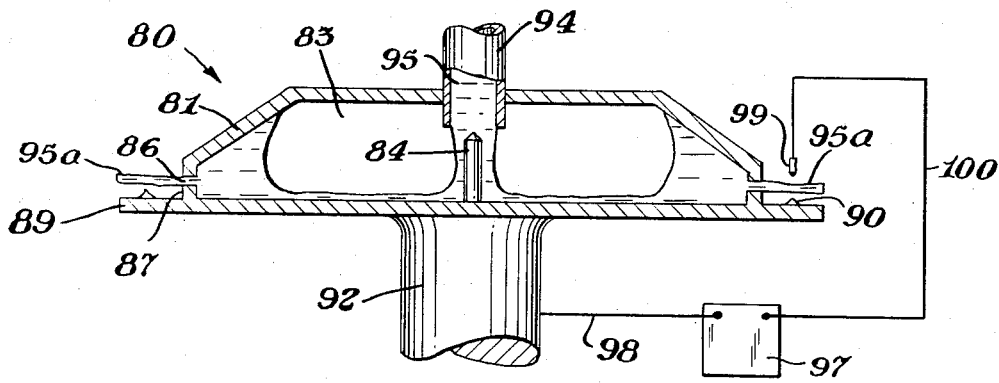
FIGURE 3 is a partly in section view of an alternate embodiment of a rotor.

In FIGURE 3 there is illustrated a schematic partly in section view of an alternate embodiment of the invention generally designated by the reference numeral 80. The apparatus 80 comprises a rotor 81 having defined therein a cavity 83. Axially positioned within the cavity 83 is a pin or mandrel 84. A plurality of passageways 86 provide communication between the cavity 83 and the external face 87 of the rotor 80. A flange 89 extends about the periphery of the rotor 80 generally adjacent to the passageways 86. A flange 89 is provided with a ridge or land 90 which projects toward the passageways 86. The rotor 81 is driven and supported by a hub 92. Disposed generally opposite to the pin 84 within the cavity 83 of the rotor 80 is a molten polymer supply source 94 delivering molten polymer 95 to the cavity 83. The molten polymer 95 is extruded through the passageways 86 to form the strands 95A. In cooperative association with the rotor 81 is a high voltage source 97. The high voltage source 97 is in electrical communication with the rotor 80 through the conductor 98 and an electrode 99 through the conductor 100. The electrode 99 is positioned generally adjacent the passageways 86 and facing the ridge 90 of the flange 89. The electrode 99 is supported independently from the rotor and does not rotate therewith.

Figure 4:
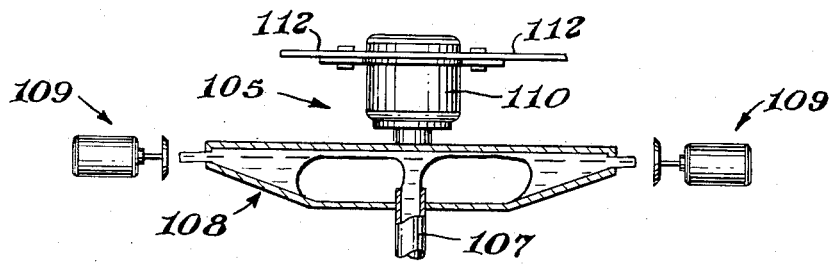
FIGURE 4 depicts an alternate arrangement of an apparatus in accordance with the invention.

In FIGURE 4 there is schematically illustrated an alternate method of positioning of an apparatus 105 in accordance with the invention. The apparatus 105 comprises a molten polymer feed source 107 in operative association with a downwardly facing rotor 108, a plurality of cutting means 109 and a source of rotational energy 110 coupled to the rotor 108. The rotor and its drive assembly 110 are secured to a supporting means 112.

Figure 5:
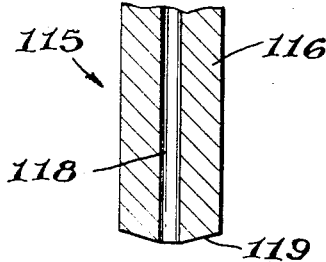
FIGURE 5 shows an alternate configuration of a feed tube.

In FIGURE 5 there is illustrated a sectional view of the terminal portion of an alternate polymer feed tube for the practice of the invention. The tube 115 comprises a body portion 116 having defined therein a passageway 118 and the body 116 as a generally convex and frustoconical terminal portion 119, which tapers toward the termination of the passageway 118.

Figure 6:
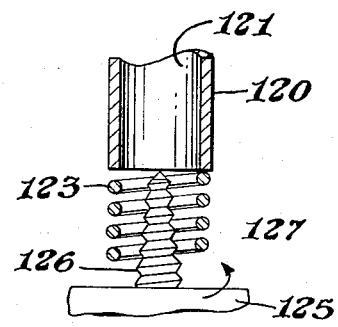
FIGURE 6 illustrates an alternate feed arrangement.

In FIGURE 6 there is a partially-in-section view of an alternate feed system comprising a conduit 120 defining an internal passageway 121. A helix 123 is disposed adjacent the terminal portion of the passage 121 and extends beyond the conduit 120. A rotor 125 (partially shown) is disposed opposite to and generally coaxial with the conduit 120. The direction of rotation of the rotor is indicated by the arrow. A screw 127 is axially positioned and secured to the rotor 125, the screw 127 extending partially into the helix 123. The screw 127 is provided with a right hand thread 126, while the helix 123 is of a left hand configuration.

Operation of the apparatus of the present invention may be readily understood by reference to FIGURES 1 and 2. In FIGURE 1 a molten polymer 14 is added to the cavity 24 of a rapidly rotating rotor 20. Centrifugal force causes a polymer 14 to be forced against the peripheral portions of the cavity 24 through the screen pack or filter 24 and extruded from the passageways 26 as a plurality of rods. This phenomena is clearly pictured in FIGURE 2 wherein the polymeric material 67 issues from the passageways 64 as the rods 67A. As the rotor revolves, the extruded rod contacts a cut off mechanism such as the assemblies 40 of FIGURE 1 or 70 of FIGURE 2. The rod or amount of thermoplastic resinous material in the rotor is maintained at a desirable level by means of either manual control of the quantity of molten polymer added to the rotor or by varying the rotational speed of the rotor.

Beneficially, an automatic control element such as 48 in FIGURE 1 is incorporated wherein a sensing element is placed within the cavity 24 of the rotor 20 and a portion of the sensing element is resiliently loaded against the substantially vertical face of the molten polymeric material. Due to the viscoelastic rheological characteristics of the molten thermoplastic resinous material moving at a high speed past the first sensing element no tendency is observed for the material to adhere thereto. Observation indicates that the sensing element acts no differently than if in contact with a solid surface. The extruded thermoplastic resinous rod is in a generally fluid highly viscous condition when it contacts a cutting means such as 40 of FIGURE 1 or 70 of FIGURE 2. However, by utilizing a cooled knife, such as the blades 40 of FIGURE 1 and 71 of FIGURE 2, no tendency is observed for the material to adhere thereto. When relatively large rods are extruded from an apparatus in accordance with the invention, it is beneficial to employ a cooling fluid such as is supplied by the nozzles 75 of FIGURE 2. The function of the cooling fluid is to cool the granule or droplet to at least a semi-solid condition prior to its contact with other granules. In cases where relatively small rods are extruded and cut, this additional cooling is usually not necessary as there is sufficient loss of heat from the granule as it travels through the air or other gas adjacent the rotor.

An alternate manner of severing the particle is to utilize an electrical arc such as is schematically set forth in FIGURE 3. In certain instances it is advantageous to utilize an arc technique, particularly if plastics of relatively low viscosity are utilized and it is desired to employ a number of points to sever the extruded rod which are closer than one can conveniently position a knife. In certain instances the function of severing the granules from extruded rod can be combined with beneficial oxidation treatment such as in the case of polyethylene. As each granule is severed in the arc in an air atmosphere sufficient surface oxidation of the polyethylene occurs to markedly improve ink adhesion, printability and like properties. As illustrated in FIGURE 4, the apparatus in accordance with the invention may be operated in substantially any position including with the axis of the rotor vertical, horizontal, or in any intermediate position. The centrifugal force required for satisfactory extrusion of the thermoplastic material into rods is sufficiently high that the effect of the force of the gravity is negligible and has substantially no effect on the preparation. Usually it is advantageous to space the rotating knives or spark gap relatively close to the exit end of the extrusion passageway in order that a generally light cylindrical particle is prepared. Often such a spacing is about the diameter of the extrusion orifice and generally is less than about 0.005 inch. Beneficially, the shape of the particle may be other than cylindrical as extrusion passageways having other than the circular cross section are employed. Triangular, square, rectangular and like configurations are readily utilized for the cross sectional configuration of the peripheral passageways of the rotor.

Frequently, if it is desired to sever such strands or rods at angles other than those approximating right angles, the means to sever the rod are moved away from the periphery of the rotor and the tendency of the rod to curve allows contact with the cutting means at decreasing angles to the axis of the extruded rod as the cover is removed from the periphery. This is due primarily to the air resistance of the extruded rod which tends to cause it to bend away from the true radius of the disc. Beneficially, the radial angular spacing of the cutters about the periphery of the rotor may be utilized to determine the particles size distribution. For example, in FIGURE 2 four cutters are disposed about the periphery of the rotor at a constant distance from the extrusion orifices. The lower cutter 70, designated as A, will sever longer granules from the rods 67A than will the adjacent cutter B. The rate of extrusion of the rods from the orifice is constant and the length of the rod to be cut will be generally proportional to the angle between the cutter in question and the cutter which last cut the particular extruded rod. For example, the cutter B cuts granules of a smaller size than A, while the cutter C severs granules which are larger than those cut by the cutter B and smaller than those severed by the cutter A. The cutter D produces granules which are intermediate in size between those generated by the cutters A and C. Thus, by selectively positioning rotating cutters or electrical arcs about the periphery of the rotor, very uniform size distribution of the granules may be obtained at will. It is also possible to vary the size of the granules by altering the rotational speed of the rotor. Thus, if a given configuration of cutters is used an increase in the speed of the rotor will produce longer granules, whereas reducing the speed of the rotor produces shorter granules. If desired, the particle size distribution of the granule is readily controlled by utilizing peripheral passages in a rotor of varying predetermined dimensions. Beneficially, the diameter of the extruded rod is readily varied when employing a rotor having a constant passage dimension by increasing or decreasing the rotational speed and moving the cutters closer or further away from the periphery of the rotor. On issuing from the peripheral passageways or orifices, the rod has a tendency to neck down or decrease in diameter. This tendency becomes greater as the length of the rod is increased prior to cutting. Thus, the cross sectional dimension of the granules are readily controlled in this manner.

In sharp contrast to most extrusion apparatus, the filtering mechanism which is readily removable is usually incorporated within the rotor such as the screen pack 25 of FIGURE 1. This pack beneficially may be added to the rotor as a continuous tape wound inside the rotor or alternately it may be made up in a plurality of segments which can be temporarily positioned and subsequently held in their final position by the centrifugal force generated by rotation of the rotor. It is critical to the operation of the embodiment of the invention depicted in FIGURES 1, 2 and 4 that the means to sever the strand are cooled knives. If no cooling knives are utilized, the polymer rods or strands will not be cut cleanly and will tend to form a coating and render them and the entire apparatus substantially inoperable. The knives must be maintained at a temperature below the thermoplastic temperature of the polymer composition. This is readily accomplished by applying a stream of air which serves the dual purpose of cooling both the knife and the extrude. This cooling is readily provided by a fluid passing from channels 73 and 74 along the surfaces of the blade 70. For cutting strands into relatively uniform particles it is desirable to use only passage 73 remote from the rotor. However, if a wider particle size distribution is desired, passageway 74 is utilized or if maximum cooling is required both passages are utilized.

A wide variety of means may be utilized for driving rotors of apparatus in accordance with the invention. Typical of these are electrical motors, wherein the rotor is mounted directly on the motor shaft. Beneficially, an indirect connection to the motor or driving source may be employed such as belts, gear trains, and the like in order that a desired rotational speed is achieved. Particularly convenient for experimental purposes is the direct mounting of the rotor on the turbine or air motor shaft which permits rapid and easy variation of the rotational speed by means of a valve controlling compressed air, steam, or liquid under pressure utilized to drive the turbine or fluid motor.

Feeding of the molten polymer to the rotor is critical and must be done with care in order to avoid unbalance in the rotor during the operation. Three general techniques are depicted: (1) the method utilized in FIGURE 1 which is eminently satisfactory when the tube is generally axially positioned with respect to the rotor and the rotating pin or mandrel secured to the rotor and also the rotor's axis projects toward the outlet of the feed tube. In the absence of this pin such as is shown in FIGURES 1 and 3, fluid, highly viscous polymeric material has a tendency to become off centered and flow upward on the outside surface of the feed conduit. If the conduit is positioned close to the bottom of the cavity in the rotor the polymer "crawls" up the outside surface of the conduit, and if an attempt is made to overcome this difficulty by raising the conduit the feed stream will wobble and not uniformly distribute the material within the rotor. (2) An alternate configuration of a feed tube is shown in FIGURE 5 wherein a generally conical end is provided. This configuration permits the polymeric material to be introduced to the center portion of the rotor and be uniformly distributed by the centrifugal force. (3) The configuration of FIGURE 6, when a screw is provided and the rotor which on rotation draws material toward the surface thereof, acting in cooperation with the helix of opposite hand.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the preparation of particulate thermoplastic material, the apparatus comprising
   a means to supply a heat plastified viscoelastic thermoplastic resinous material to an internal cavity of a rotor, the means to supply the heat plastified resinous material comprising
   a tube for delivery of the plastified material, a discharge portion of the tube being positioned generally axially with and opposed to said rotor,
   a flow control means positioned within the cavity of the rotor and facing the discharge portion of said tube, the flow control means being in spaced adjacent relationship to the tube, said rotor comprising
      a generally circular body, said body defining the internal cavity,
      a plurality of circumferential passageways generally radially disposed with respect to the axis of rotation of said rotor, said passageways communicating between said cavity and the periphery of the rotor,
   means to rotate the rotor, and
   means to sever the thermoplastic resinous material positioned generally adjacent to and spaced from the periphery of the said rotor and said passageways.

2. The apparatus of claim 1, wherein the flow control means is a pin axially positioned within the cavity of said rotor and in closely spaced adjacent relationship to the discharge portion of said delivery tube.

3. The apparatus of claim 1, including a generally circumferentially disposed filter medium positioned within said cavity.

4. The apparatus of claim 1, wherein said means to sever said thermoplastic resinous material comprises at least one knife.

5. The apparatus of claim 4, wherein said knife is a disc.

6. The apparatus of claim 1, including means to sense the quantity of heat plastified thermoplastic resin in said rotor.

7. The apparatus of claim 6, wherein said sensing element comprises an arm member extending into said rotor cavity and adapted to rest against the surface of the thremoplastic resinous material when said rotor is rotating.

8. The apparatus of claim 1, wherein the flow control means comprises a helix and a screw, said discharge portion of the feed tube terminating in the helix, the screw axially affixed to said rotor and extending into said helix, and said screw and said helix being of opposite hand.

9. The apparatus of claim 1, wherein said means to sever the thermoplastic resinous material comprises opposed first and second electrodes disposed generally adjacent the periphery of said rotor, said electrodes being in communication with a source of high voltage.

10. The apparatus of claim 9, wherein said first electrode comprises a flange extending in generally parallel relationship to said passageways.

11. The apparatus of claim 1, wherein said flange carries a land, said land being generally directed toward said passageways and opposite to said second electrode.

12. The apparatus of claim 1, wherein said discharge portion of the tube terminates adjacent the rotating face of said rotor in a generally convex configuration.

13. The apparatus of claim 12, wherein said discharge portion of the tube has a generally frusto-conical configuration.

14. The apparatus of claim 1, wherein means are provided external to said rotor to cool the severed thermoplastic resinous material from said rotor.

15. The apparatus of claim 14, wherein said cooling means comprises nozzles directed toward the periphery of said rotor.

References Cited

UNITED STATES PATENTS

| | | | |
|---|---|---|---|
| 809,671 | 1/1906 | Cowing | 18—2.6 |
| 2,310,590 | 2/1943 | Marelte | 18—2.6 X |
| 2,401,236 | 5/1946 | Fielitz | 18—12 |
| 2,488,595 | 11/1949 | Henning | 18—12 |
| 2,525,970 | 10/1950 | Spier et al. | 18—2.6 X |
| 2,539,916 | 1/1951 | Ludington et al. | 18—12 |
| 2,647,474 | 8/1953 | Popick. | |
| 2,653,350 | 9/1953 | Prfernix | 18—12 |
| 2,728,943 | 1/1956 | Hertz et al. | 18—12 |
| 2,771,636 | 11/1956 | McIntosh et al. | 18—12 |
| 3,015,128 | 1/1962 | Somerville | 18—2.6 |
| 3,025,564 | 3/1962 | Voigt | 18—2.6 X |
| 3,055,049 | 9/1962 | De Bruyne et al. | 18—2.6 |
| 3,230,582 | 1/1966 | Hoffman et al. | 18—12 |

WILLIAM J. STEPHENSON, *Primary Examiner.*